United States Patent [19]

Nozaka et al.

[11] Patent Number: 4,836,738
[45] Date of Patent: Jun. 6, 1989

[54] LOAD HANDLING VEHICLE

[75] Inventors: Kenkichi Nozaka; Yosihiro Kawahara; Yuji Kitamura; Shigeru Morita; Sadayuki Takahashi, all of Osaka, Japan

[73] Assignee: Kubota Ltd., Osaka, Japan

[21] Appl. No.: 188,764

[22] Filed: May 3, 1988

Related U.S. Application Data

[63] Continuation of Ser. No. 910,025, Sep. 22, 1986, abandoned.

[30] Foreign Application Priority Data

Sep. 25, 1985 [JP] Japan .................. 60-146756[U]
Nov. 20, 1985 [JP] Japan .................. 60-179735[U]
Jan. 23, 1986 [JP] Japan .................. 61-8447[U]

[51] Int. Cl.⁴ .................. B62D 33/06; B62D 49/00; B66F 9/12
[52] U.S. Cl. .................. 414/607; 280/756; 280/759; 280/785; 296/190; 296/197; 414/667; 414/914
[58] Field of Search .............. 414/641, 642, 663, 664, 414/666-671, 607, 914; 296/190, 187, 197, 203, 204, 29, 30, 102; 280/756, 759, 785

[56] References Cited

U.S. PATENT DOCUMENTS

| | | | |
|---|---|---|---|
| 1,334,312 | 3/1920 | Motts et al. | 296/102 X |
| 2,074,158 | 3/1937 | Avery | 280/785 |
| 2,205,999 | 6/1940 | Bartlett et al. | 280/785 X |
| 2,256,890 | 9/1941 | Brown et al. | 296/102 X |
| 2,482,692 | 9/1949 | Quales et al. | 414/607 |
| 2,911,232 | 11/1959 | Hastings, Jr. et al. | 414/914 X |
| 3,289,873 | 12/1966 | Hansen | 414/671 |
| 3,472,550 | 10/1969 | Marco | 296/102 |
| 3,834,754 | 9/1974 | Zajichek | 280/756 X |
| 4,023,851 | 5/1977 | Palmer et al. | 296/190 |
| 4,040,640 | 8/1977 | Begg | 296/204 X |
| 4,050,535 | 9/1977 | Bosshart et al. | 296/190 X |
| 4,102,537 | 7/1978 | Takahashi et al. | 296/102 |
| 4,125,199 | 11/1978 | Abels et al. | 414/671 |
| 4,607,997 | 8/1986 | Asano | 414/667 |

FOREIGN PATENT DOCUMENTS 146480 11/1981 Japan .................. 296/190

*Primary Examiner*—David A. Bucci
*Attorney, Agent, or Firm*—Birch, Stewart, Kolasch & Birch

[57] ABSTRACT

A load handling vehicle equipped with a load handling device comprises a pair of reinforcing frames attached to opposite sides of the vehicle body, a steering panel, a front cover covering the space under the panel from the front and a protective device covering the operator's seat and including a pair of opposite front posts connected to the frames in front of the seat. Each of the front posts comprises a lower post member extending upright from the frame and positioned in the vicinity of of the front cover, and an upper post member removably attached to the lower post member. The steering panel and the front cover are attached to the pair of lower post members and can therefore be fixed in place by a simple arrangement and yet with increased strength. When unnecessary, the protective device is removable with the panel and the cover fixed in place.

19 Claims, 12 Drawing Sheets

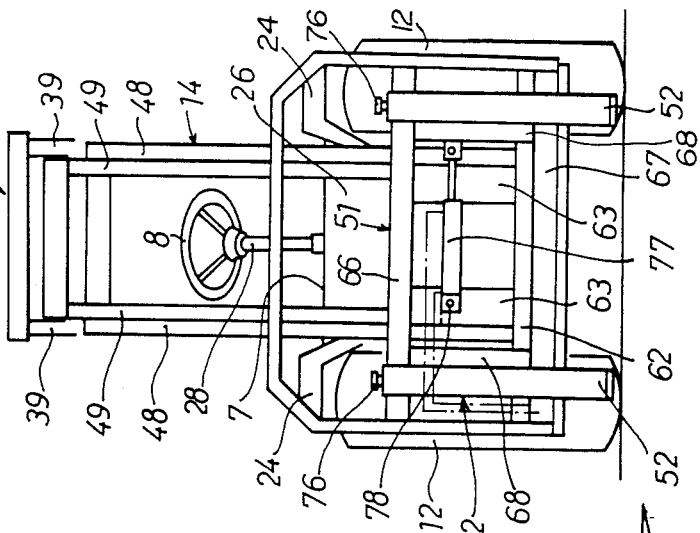
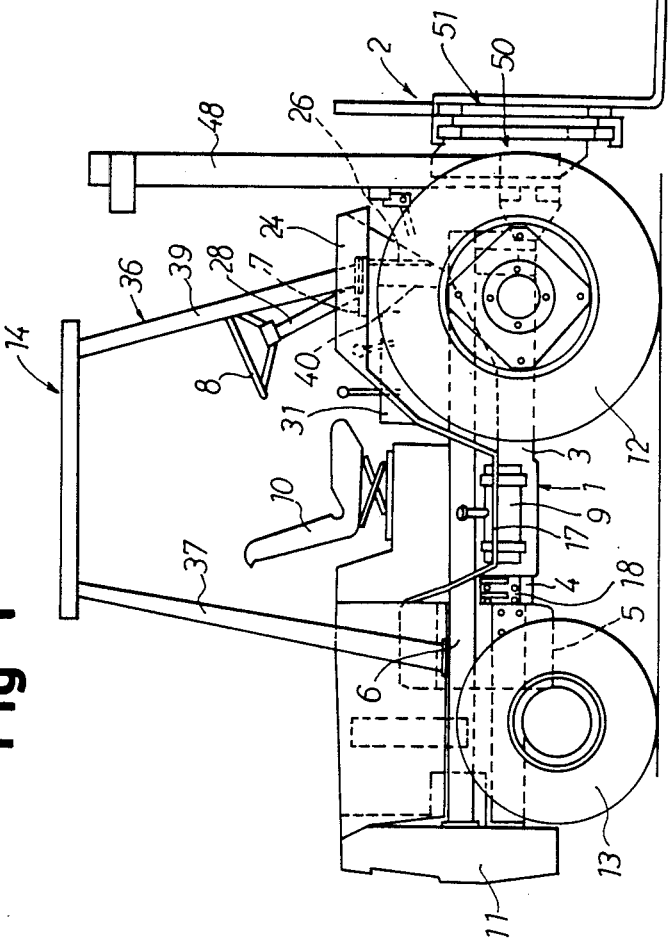

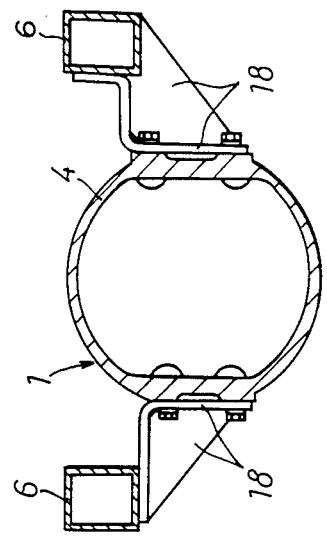
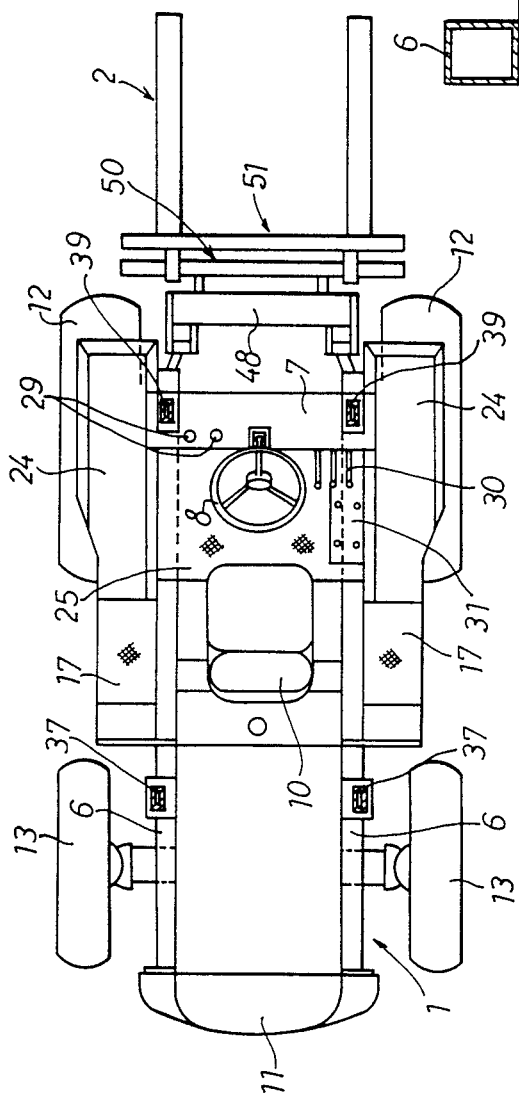

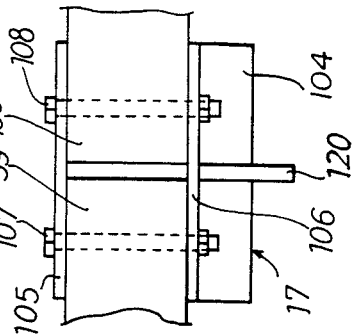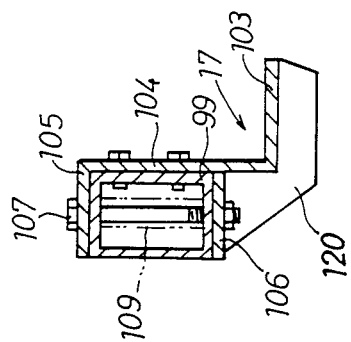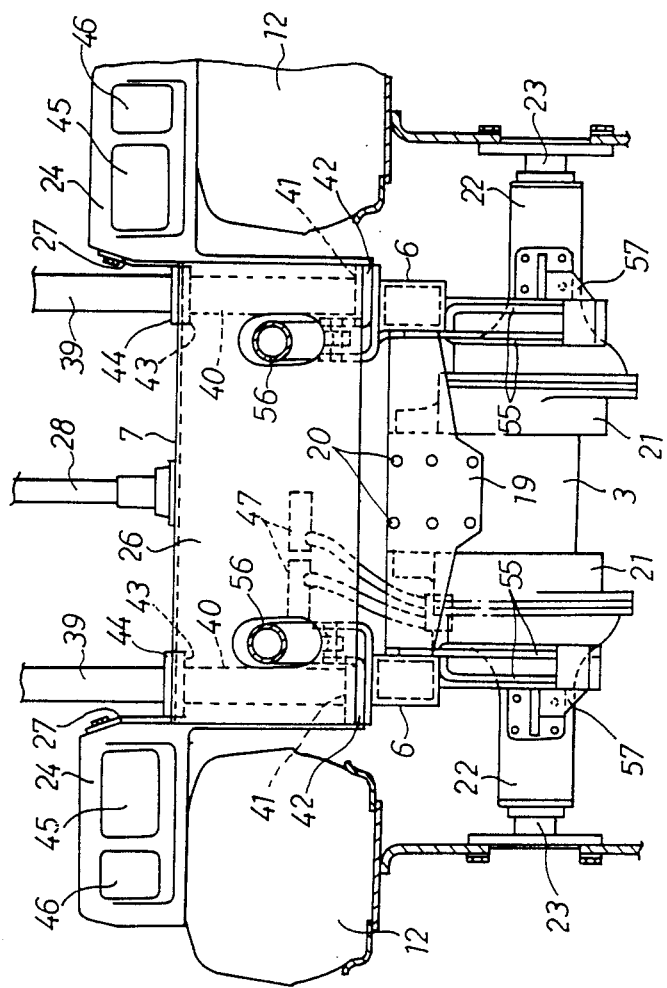

LOAD HANDLING VEHICLE

This application is a continuation, of application Ser. No. 910,025 filed on Sept. 22, 1986, now abandoned.

FIELD OF THE INVENTION AND RELATED ART STATEMENT

The present invention relates to a load handling vehicle equipped with a load handling device at the front of the vehicle body.

Load handling vehicles equipped with a forklift or like load handling device at the front of the vehicle body have a frame attached to each side of the vehicle body and extending longitudinally thereof. Between the opposed front wheel fenders, the vehicle has a steering panel provided with a steering wheel, control levers and other steering means, and a front cover covering the space under the steering panel from the front. The driver's seat is covered with a safety frame or like protective device which includes a pair of opposite front posts positioned in front of the driver's seat and attached to the opposite side frames.

With conventional vehicles of the type described, the front posts of the safety frame or like protective device are attached to the front ends of the side frames, and in the rear of the front posts, the opposed front wheel fenders are interconnected by the steering panel and the front cover. Thus, the front posts are generally not adapted to reinforce the steering panel assembly.

Accordingly, when the steering panel is provided with the steering wheel, control levers and other steering means, the panel needs to be reinforced by a structure which is complex and reduces the space available for the operator's feet under the steering panel, making the operator feel uncomfortable.

Furthermore, the lower ends of the front posts of the protective device are attached to the side frames on the vehicle body in a space surrounded at four sides by the load handling device, the front cover and the front wheel fenders, so that the protective device is extremely difficult to remove when unnecessary.

The conventional arrangement including the steering panel, the front cover, the front posts, etc. further has the drawback of appearing unsightly since the front posts are positioned in front of the steering panel independently thereof.

OBJECTS AND SUMMARY OF THE INVENTION

The present invention has been accomplished to overcome the foregoing problems heretofore encountered.

More specifically, a first object of the present invention is to provide a load handling vehicle in which a steering panel and a front cover are mounted in place utilizing a pair of opposite front posts of a safety frame or like protective device to reinforce the panel and the cover by a simple structure and to assure the operator's feet of a comfortable space.

A second object of the present invention is to provide a load handling vehicle of the type described from which the protective device is readily removable when unnecessary and in which the steering panel can be held mounted in place by portions of the front posts, i.e. the lower half post portions, of the protective device even after the device is removed.

A third object of the present invention is to provide a load handling vehicle of the type described wherein the upper portions of the front posts of the protective device extend upward from the opposite ends of the steering panel to give a neat appearance to the assembly of the panel, the front cover and the neighboring parts.

Other objects of the present invention will become more apparent from the following description with reference to the accompanying drawings.

These objects of the present invention can be fulfilled by a load handling vehicle having a frame attached to each side of the body of the vehicle and extending longitudinally thereof, a steering panel provided with steering means including a steering wheel, a front cover covering the space under the steering panel from the front, the steering panel and the front cover being provided between opposite front wheel fenders, a protective device covering the operator's seat of the vehicle and having a pair of opposite front posts, each of the front posts being connected to the frame at a position in front of the operator's seat, and a load handling device positioned in front of the steering panel and attached to the front end of the vehicle body, the vehicle being characterized in that each of the front posts comprises a lower post member extending upright from the frame and positioned in the vicinity of the front cover and an upper post member removably attached to the lower post member, the steering panel and the front cover being attached to the pair of opposite lower post members.

BRIEF DESCRIPTION OF THE DRAWINGS

FIG. 1 is an overall side elevation showing a load handling vehicle embodying the present invention;

FIG. 2 is a plan view showing the vehicle in its entirety;

FIG. 3 is a front view showing the vehicle in its entirety;

FIG. 5 is a view in section showing a clutch housing;

FIG. 7 is a front view in section showing the vehicle front portion;

FIG. 17 is a rear view showing the rear portion of the vehicle;

FIG. 19 is a side elevation showing a divided portion of a reinforcing frame;

FIG. 20 is a sectional view showing the divided portion;

DESCRIPTION OF THE PREFERRED EMBODIMENTS

Figure 4:
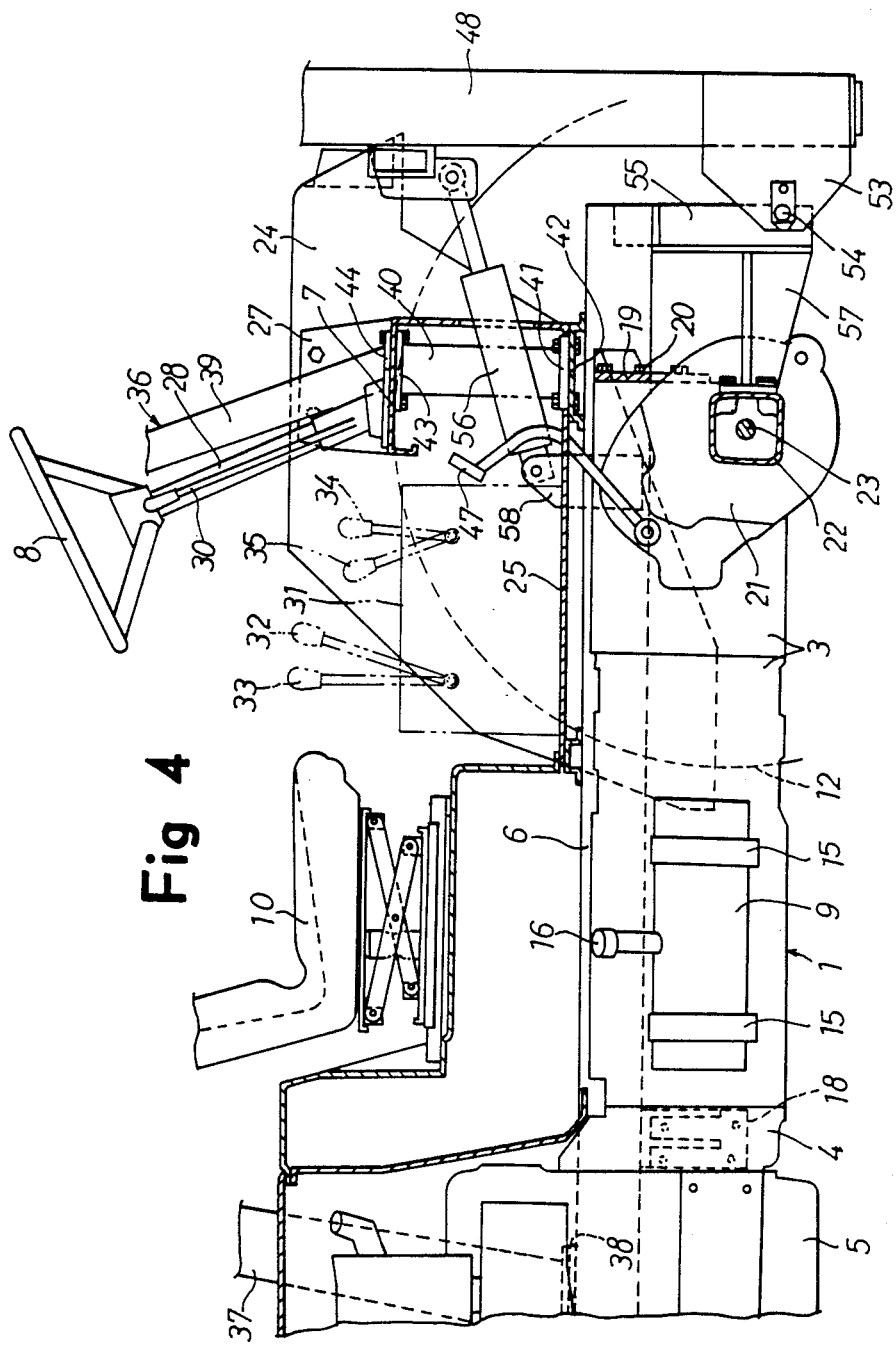
FIG. 4 is a side elevation partly broken away and showing the front portion of the vehicle.

The present invention will be described below in detail with reference to the illustrated preferred embodiments. FIGS. 1 to 3 show a load handling vehicle having a load handling device 2 attached to the front end of the vehicle body 1 and provided with a fork.

The vehicle body 1 comprises a transmission case 3, a clutch housing 4 and an engine 5 which are arranged in series longitudinally of the vehicle and separably joined together by bolts. A pair of reinforcing frames 6 extending longitudinally of the vehicle body 1 are provided on opposite sides of the body 1 at its upper portion. The vehicle body 1 is provided with a steering panel 7, a steering wheel 8, etc. at its front portion, a fuel tank 9, a driver's seat 10, etc. at its midportion, and a weight 11 serving also as a grille at its rear end. The vehicle body further has front wheels 12, rear wheels 13 and a safety frame 14.

As seen in FIGS. 1 and 4, the fuel tank 9 is attached to the side of the longitudinally middle portion of the body 1 by brackets 15. The fuel tank 9 has an oil inlet 16 which is positioned above a step 17 for the driver to ride in the vehicle. Accordingly, fuel can be replenished easily through the oil inlet 16 with a fuel container placed on the step 17.

Figure 6:
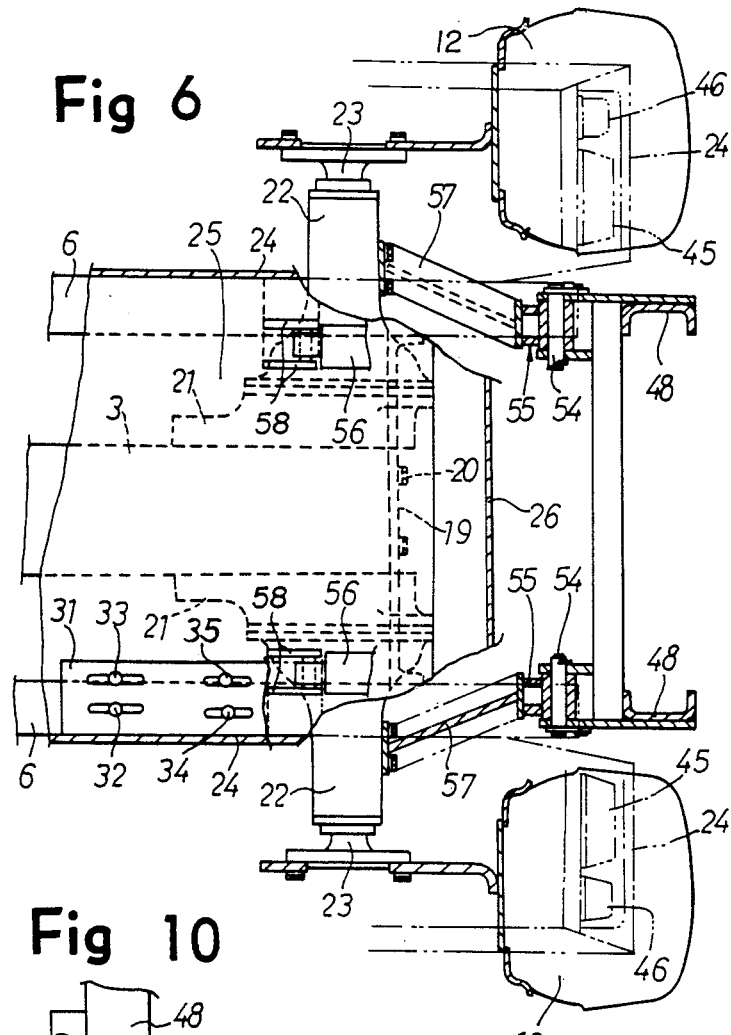
FIG. 6 is a plan view in section showing the vehicle front portion.

As seen in FIG. 5, the opposed reinforcing frames 6 are connected by brackets 18 to the opposite sides of the clutch housing 4 constituting the vehicle body 1. FIGS. 4, 6 and 7 show that the reinforcing frames 6 are also connected to the front end of the transmission case 3 by a connecting plate 19. More specifically, the reinforcing frames 6 are interconnected at their front end portions by the connecting plate 19 which is fastened to the front end of the case 3 by bolts 20.

Figures 8, 9:
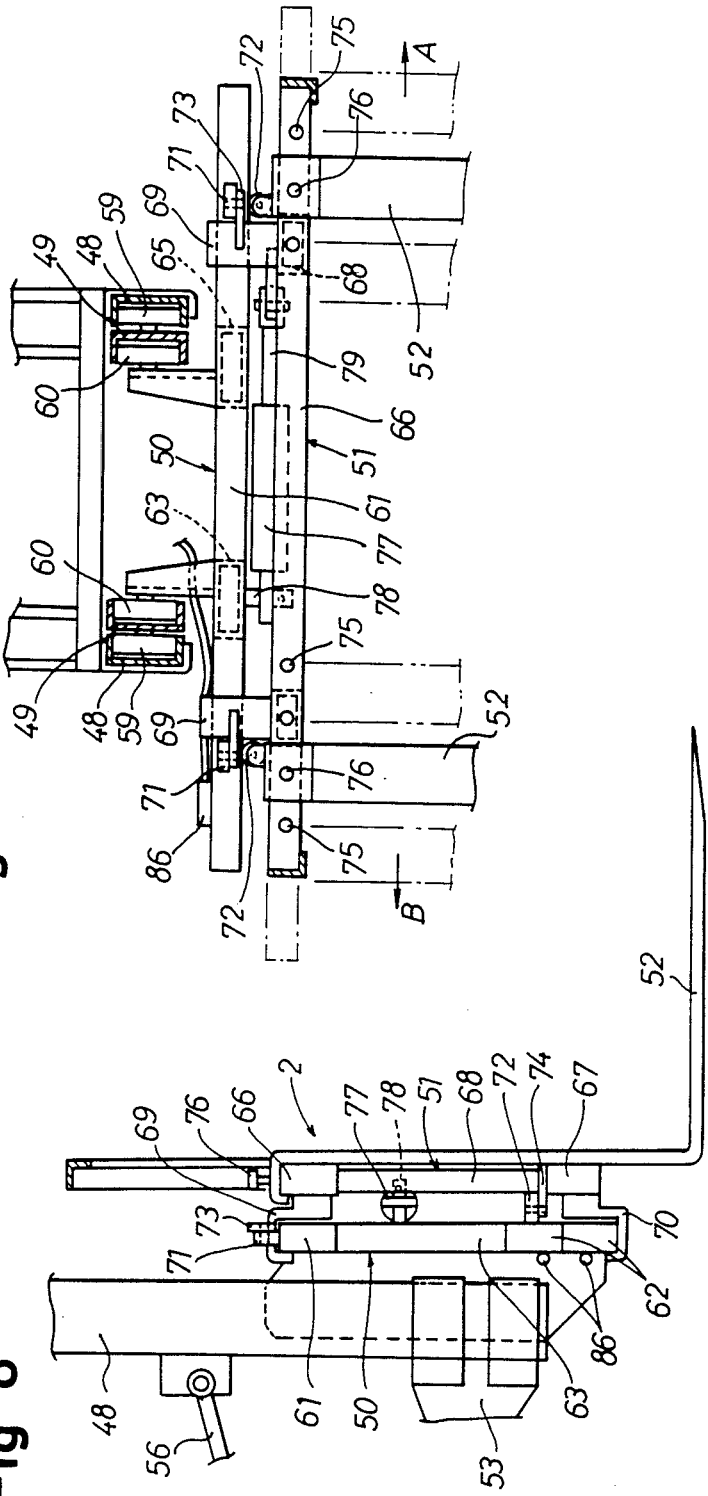
FIG. 8 is a side elevation showing a load handling device.
FIG. 9 is a plan view partly broken away and showing the load handling device.

With reference to FIGS. 4, 6 and 9, the front wheel 12 is supported by a terminal speed reduction case 21, front axle case 22, front axle 23, etc. at each side of the front end of the transmission case 3. The front wheel 12 is covered with a fender 24 from inside and fastened to suitable portions of the reinforcing frame 6, etc. Provided between the opposed front wheel fenders 24 are a step plate 25 covering the transmission case 3 from above and a front cover 26 extending upward from the front end of the step plate 25.

As shown in FIGS. 4 and 7, the front cover 26 covers the space under the steering panel 7 from the front, is made integral with the steering panel 7 in an inverted L-shaped arrangement and is connected at its opposite ends to the opposed front wheel fenders 24. The steering panel 7 is supported at its opposite ends by front posts 36 of the safety frame 14 as will be described later and is connected to the pair of front wheel fenders 24 by plates 27.

The operation panel 7 is provided with a post 28 in the transversely middle portion thereof for supporting the steering wheel 8 and with various instruments 29 and control levers 30 on opposite sides of the post 28. The control levers 30 are arranged transversely for operating the load handling device through a valve unit. Through unillustrated means, the rear wheels 13 are turnable each about a kingpin by the steering wheel 8.

The step 17 is provided in the rear of the lower end of the front wheel fender 24. Disposed inside the right front wheel fender 24 is a lever box 31 which is provided with a main speed change lever 32, forward-reverse change lever 33, high-low speed change lever 34 and on-off lever 35 for driving the rear wheels. When the lever 35 is in on position, the four wheels 12, 13 are driven, while when it is in off position, only two wheels, i.e., the front wheels 12, are driven.

With reference to FIGS. 1 and 7, the safety frame 14 comprises four posts, i.e., the aforementioned front posts 36 and rear posts 37. The rear posts 37 are fastened on opposite sides of the engine 5 to plates 38 on the reinforcing frames 6 removably. As shown in FIGS. 4 and 7, each of the front posts 36 comprises divided upper and lower portions, i.e., an upper post member 39 and a lower post member 40. Each lower post member 40 is positioned upright behind the front cover 26 and has a flangelike lower joint plate 41 which is fastened to a joint plate 42 on the reinforcing frame 6. The lower post member 40 has at its upper end a flangelike upper joint portion 43, to the upper side of which the steering panel 7 is attached. The upper post member 39 has at its lower end a flangelike lower joint portion 44 which is vertically opposed to the upper joint portion 43 of the lower post member 40 and bears on the upper surface of the panel 7. The upper joint portion 43 of the lower post member 40 and the lower joint portion 44 of the upper post member 39 are fastened together by bolts with panel 7 clamped therebetween. Accordingly, the steering panel 7 is connected at its opposite sides to the pair of opposite lower post members 40 and to the front wheel fenders 24. The front cover 26 is connected at its upper end to the lower post members 40 by the steering panel 7, at its opposite sides to the front wheel fenders 24, and at its lower end to the step plate 25. Thus, the steering panel 7 and the front cover 26 can be reliably supported utilizing the lower post members 40. Consequently, the post 28 for the steering wheel 8 can be mounted on the panel 7 which is supported by a simple arrangement without necessitating a special reinforcement for the panel 7. A sufficient space is therefore available under the steering panel for the feet of the operator seated in the seat 10, assuring him of comfort.

When unnecessary, the safety frame 14 is readily removable by removing the upper post members 39 of the front posts 36 from the lower post members 40 and removing the rear posts from the plates 38 on the reinforcing frames 6. In this case, the steering panel 7 is fastened to the upper joint portions 43 of the lower post members 40 by bolts after removing the upper post members 39, whereby the panel 7 and the front cover 26 can be retained in place without any trouble. With the lower portions of the front posts 36 hidden behind the front cover 26, the assembly presents a neat appearance. The upper joint portions 43 of the lower post members 40 may be welded to the steering panel 7. In this case, the lower joint portions 44 of the upper post members 39 are fastened to the upper joint portions 43 with bolts.

As shown in FIG. 6, each front wheel fender 24 is provided at its front end upper portion with a headlight 45 for projecting light forward and a winker 46. Brakes incorporated in opposite terminal speed reduction cases 21 are operable by a pair of brake pedals 47 at the same time or independently of each other.

With reference to FIGS. 1 to 3, 8 and 9, the load handling device 2 comprises stationary masts 48, lift masts 49, a lift frame 50, a fork mount 51, a fork 52, etc. As shown in FIGS. 4 and 6, each stationary mast 48 is removably pivoted by a bracket 53 at its lower end and a pin 54 to a support member 55 extending downward from the front end of the corresponding reinforcing frame 6 and is tiltable by a tilting cylinder 56. The support member 55 is reinforced by a reinforcing member 57 fixed to the front axle case 22. The body of each of the cylinders 56 making a pair is pivoted to a bracket 58 attached to the frame 6 above and in the vicinity of the front axle 23.

As seen in FIG. 9, the lift masts 49 are vertically movable through rollers 59 engaging the stationary masts 48. The lift frame 50 is also vertically movably supported by rollers 60 on the lift masts 49. The lift masts 49 and the lift frame 50 are movable upward and downward by unillustrated lift cylinders.

With reference to FIGS. 3, 8 and 9, the lift frame 50 comprises an upper horizontal member 61, lower horizontal members 62 and a pair of opposed vertical members 63 interconnecting the members 61, 62. The load handling fork 52 can be attached to the lift frame 50 by the fork mount 51. Alternatively, a load handling bucket 65 can be attached to the lift frame 50 by bucket attaching members 64 as shown in FIG. 10.

With reference to FIGS. 8 and 9, the fork mount 51, like the lift frame 50, comprises an upper horizontal member 66, a lower horizontal member 67 and a pair of opposed vertical members 68 interconnecting these members 66, 67. The fork mount 51 is mounted on the lift frame 50 by upper and lower engaging members 69, 70 and upper and lower rollers 71, 72 and is horizontally slidable on the frame 50 (transversely of the vehicle). The upper and lower engaging members 69, 70 are each in the form of a hook and are engaged with the horizontal members 61, 62, respectively. The upper engaging members 69, making a pair, are bolted to the upper horizontal member 66 of the fork mount 51 and engage the upper horizontal member 61 of the lift frame 50 from above. The lower engaging members 70, also in a pair, are removably bolted to the lower horizontal member 67 of the fork mount 51 and engage the lower horizontal member 62 of the lift frame 50 from below. The upper guide roller 71 is mounted on each upper engaging member 69 by a bracket 73 so as to horizontally roll on the upper horizontal member 61 of the lift frame 50. The lower guide rollers 72, which are rollable on the front side of the lower horizontal member 62 of the lift frame 50, are mounted on the lower horizontal member 67 of the fork mount 51 by brackets 74. The fork 52 is removably engaged with the upper horizontal member 66 of the fork mount 51 and is position-adjustably attached to the upper horizontal member 66 by bolts 76 inserted in bores 75 formed in the upper side of the member 66.

With reference to FIGS. 3, 8 and 9, a shift cylinder 77 is disposed horizontally between the fork mount 51 and the lift frame 50 for horizontally moving the mount 51 on the frame 50. The shift cylinder 77 is attached at its main body side to a pin 78 on the vertical member 63 of the lift frame 50 and at its piston rod 79 to the vertical member 68 of the fork mount 51.

Figure 10:
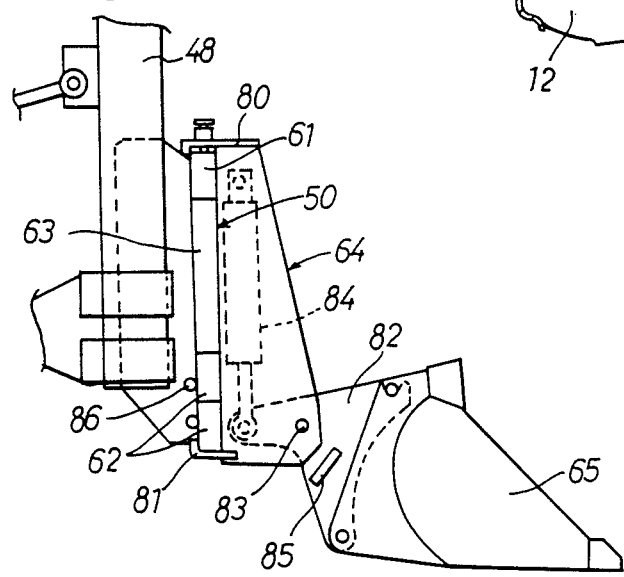
FIGS. 10 and 11 are side elevations showing the device with a bucket attached thereto.

FIG. 10 shows the aforementioned bucket attaching members 64 which are in a pair as opposed to each other. Each member 64 is removably fitted to the lift frame 50, for example from one side, by a pair of upper and lower engaging members 80, 81. The bucket attaching members 64 have a bucket arm 82 mounted thereon by a pivot 83 and a dumping cylinder 84 for pivotally moving the bucket arm 82. The arm 82 is removably provided with a bucket 65. Attached to the bucket arm 82 is a stopper 85 adapted to come into contact with the lower end of the attaching member 64 for limiting the amount of pivotal movement of the bucket 65.

As shown in FIGS. 8 and 10, the shift cylinder 77 and the dumping cylinder 84 are connected by hoses or the like to couplers 86 attached to the rear side of the lower horizontal members 62 of the lift frame 50 for taking off hydraulic pressure.

Figure 11:
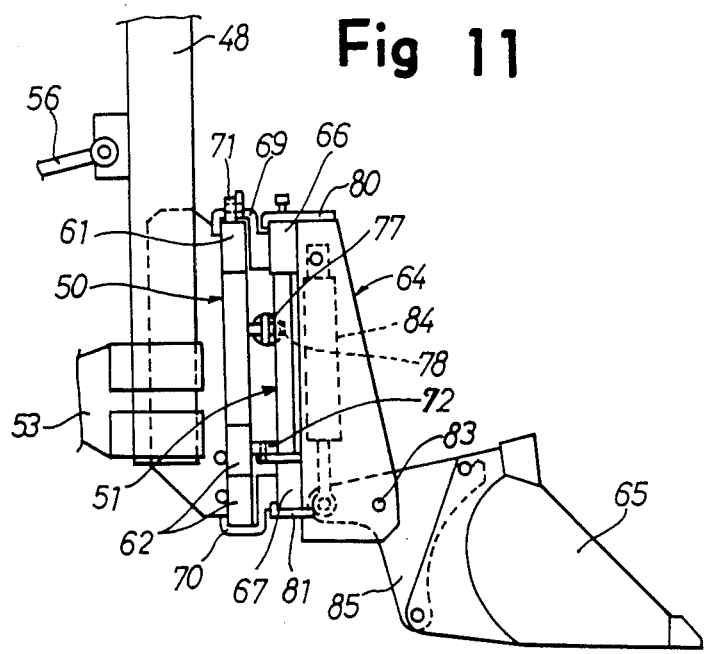

The bucket attaching members 64 may be mounted on the fork mount 51 as shown in FIG. 11. The bucket 65 is then horizontally shiftable.

To attach the fork 52 to the lift frame 50 by the fork mount 51, the upper engaging members 69 on the fork mount 51 as removed from the fork 52 are engaged with the lift frame 50 to cause the frame 50 to support the weight of the fork mount 50, and the lower engaging members 70 are fastened to the fork mount 51 by bolts. Thus, the upper and lower engaging members 69, 70 are in engagement with the lift frame 50, and the upper and lower guide rollers 71, 72 are rollably in contact with the top and the front side of the lift frame 50. Subsequently, the body of the shift cylinder 77 is attached to the pin 78, and the piston rod 79 to the vertical member 68. The fork 52 is then attached to the fork mount 51.

With the fork thus mounted in place, articles can be carried on the fork 52 by driving the vehicle while raising or lowering the lift frame 50 and tilting the stationary masts 48 in suitable combination. When the piston rod of the shift cylinder 77 is advanced, the fork mount 51 and the fork 52 slidingly move on the frame 50 in the direction of arrow A as indicated in a two-dot-and-dash line in FIG. 9, while if the rod is retracted, the frame and fork move in the opposite direction of arrow B as similarly indicated in a dot-and-dash line. Accordingly, when articles are to be stacked up, the articles can be positioned accurately with ease with respect to the transverse direction of the vehicle.

When the bucket 65 is to be used, the fork 52 and the fork mount 51 are removed from the lift frame 50, and the bucket 65 is thereafter connected to the lift frame 50 by the bucket attaching members 64 as seen in FIG. 10. The dumping cylinder 84, when operated, pivotally moves the bucket 65 about the pivot 83 as supported on the bucket arm 82 to use the bucket for scooping up, transporting and dumping earth, sand or the like.

Figure 12:
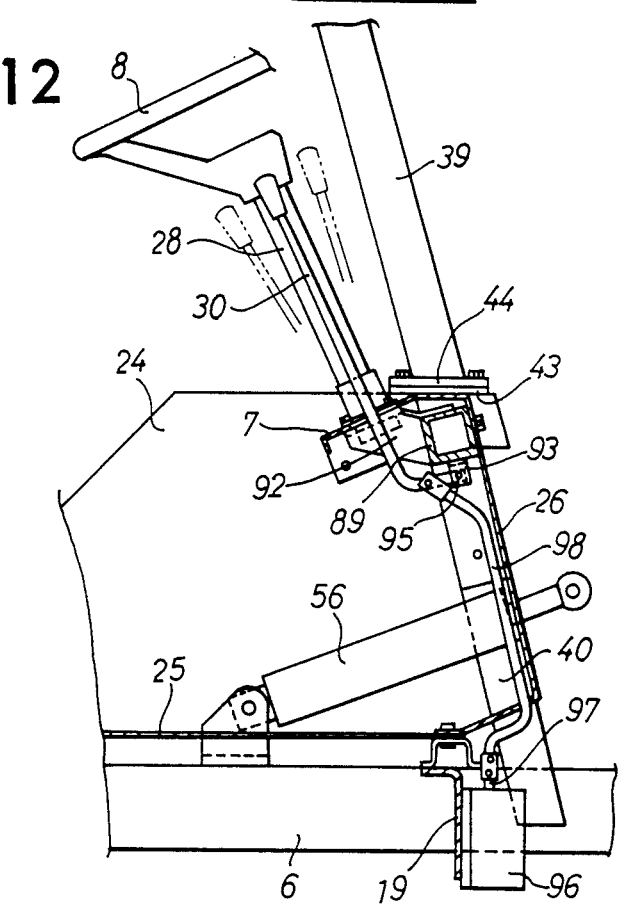
FIG. 12 is a side elevation in section showing the steering assembly of the vehicle.
Figure 13:
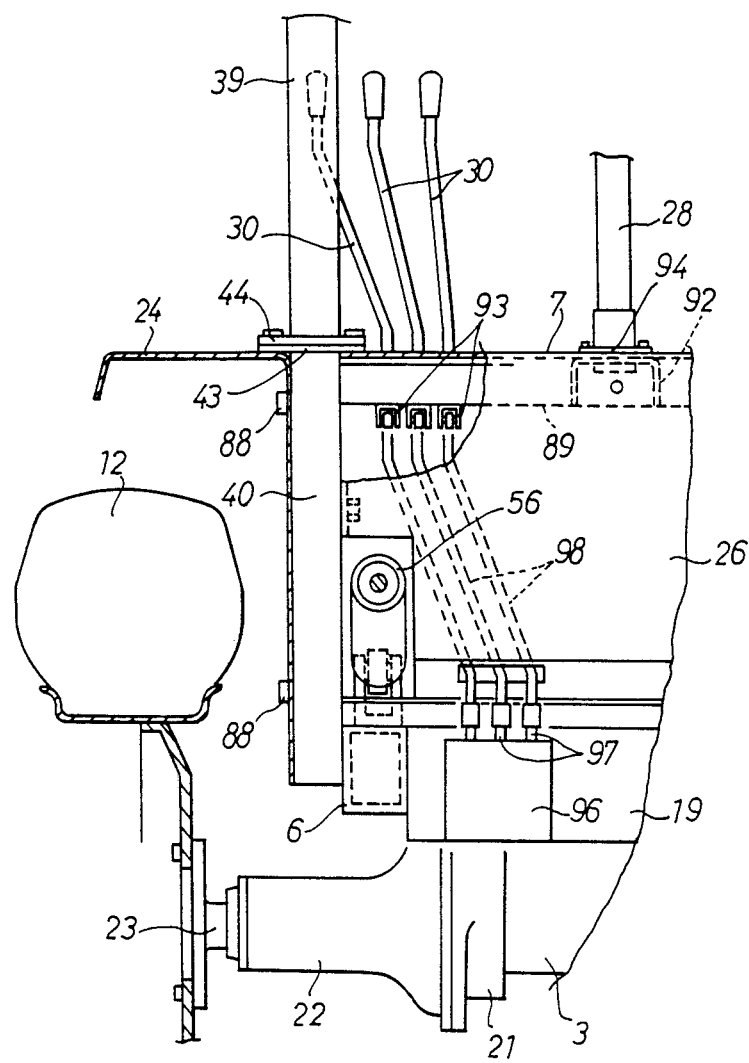
FIG. 13 is a front view partly broken away and showing a front portion of the vehicle.
Figure 14:
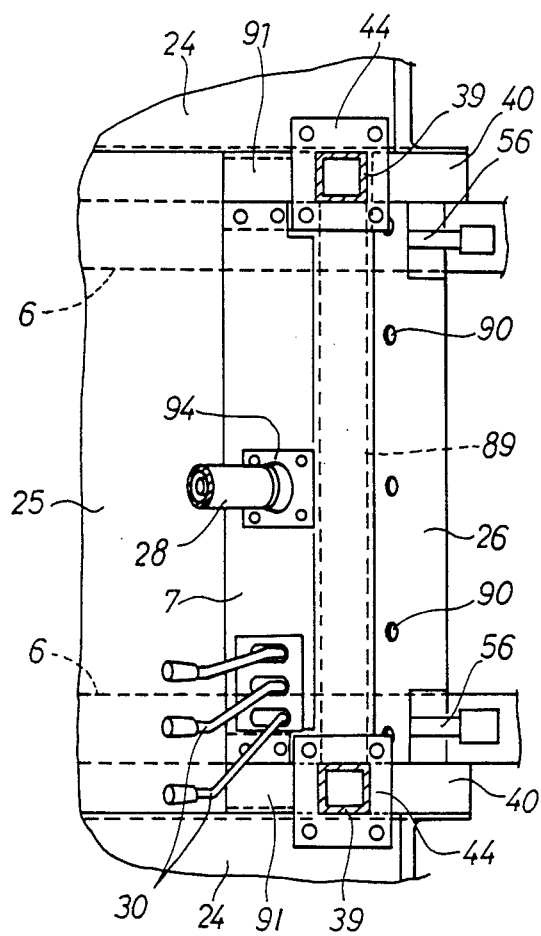
FIG. 14 is a plan view in section showing the steering assembly.

The front posts 36 of the safety frame 14, the steering panel 7 and the front cover 26 can alternatively be interconnected as shown in FIGS. 12 to 14.

The upper ends of the lower post members 40 of the front posts 36 and the steering panel 7 are approximately at the same level as the upper surface of the front wheel fenders 24. Each lower post member 40 is attached to the outer side of the corresponding reinforcing frame 6, and the adjacent fender 24 is fastened to the outer side of this lower post member 40 by bolts 88. The upper joint portion 43 at the upper end of the lower post member 40 is in contact with the upper surfaces of the fender 24 and the steering panel 7. The lower joint portion 44 of the corresponding upper post member 39 is removably fastened to the upper joint portion 43. The upper posts 39 are therefore easily removable, and the assembly appears neat even when the posts 39 are removed.

The opposed lower post members 40 are interconnected by a connecting bar 89 attached thereto as positioned close to the lower side of the upper joint portions 43. The upper end of the front cover 26 is fastened to the front side of the connecting bar 89 with bolts 90. The steering panel 7, which is integral with the front cover 26, is connected to the bar 89 by the cover 26. The front cover 26 is substantially flush with the front surfaces of the lower post members 40 and is fastened at its opposite ends to the inner side surfaces of the lower post members 40 by bolts. Opposite ends of the panel 7 are fastened by bolts to plates 91 attached to the fenders 24 and positioned in the rear of the post members 40. The connecting bar 89 is provided at the longitudinal middle portion thereof with a rearwardly projecting panel bracket 92 and toward one end thereof with three lever brackets 93, these brackets 93 being attached to the bottom surface of the bar 89. The panel 7 and a connecting plate 94 at the lower end of the steering wheel post 28 are fastened to the panel bracket 92 with bolts. The control levers 30 projecting upward through the panel 7 are pivoted to the lever brackets 93 each by a pin 95. A valve unit 96 for operating the load handling device 2 is mounted on the connecting plate 19 interconnecting the opposed reinforcing frames 6 under the front cover 26. Spools 97 projecting upward from the valve unit 96 are operatively connected to the control levers 30 by coupling rods 98. The valve unit 96 is so designed that when each control lever 30 is moved forward or rearward, the corresponding spool 97 moves upward or downward to operate the device 2 as contemplated. The coupling rods 98 extend vertically behind the front cover 26 in proximity thereto.

The opposed lower post members 40 can be supported with greatly increased stability and strength by being thus interconnected by the connecting bar 89. Consequently, the steering panel 7 and the front panel 26 attached to the connecting bar 89 are given enhanced rigidity to act against vibration or the like very advantageously. The steering panel 7 and the steering wheel post 28 are connected to the panel bracket 92 attached to the connecting bar 89, with the control levers 30 mounted on the lever brackets 93, so that the wheel post 28 and the control levers 30 can be installed in place with greater strength than when these post and levers are mounted directly on the steering panel 7, while the panel 7 can be of a smaller thickness. Furthermore, the operator is given a larger space around his feet since the coupling rods 98 operatively connecting the control levers 30 to the valve unit 96 are arranged in the rear of and close to the front cover 26.

When the reinforcing frames 6 are provided on opposite sides of the vehicle body 1 for reinforcing the body 1, there arises a need to remove the frames 6 when the body 1 is to be disassembled to inspect the interior of the clutch housing 4, the transmission case 3 or the like for maintenance. In the case of the load handling vehicle, however, it is difficult to remove the reinforcing frames 6 since the vehicle has the load handling device 2 at its front end and the weight 11 at its rear end.

Figure 15:
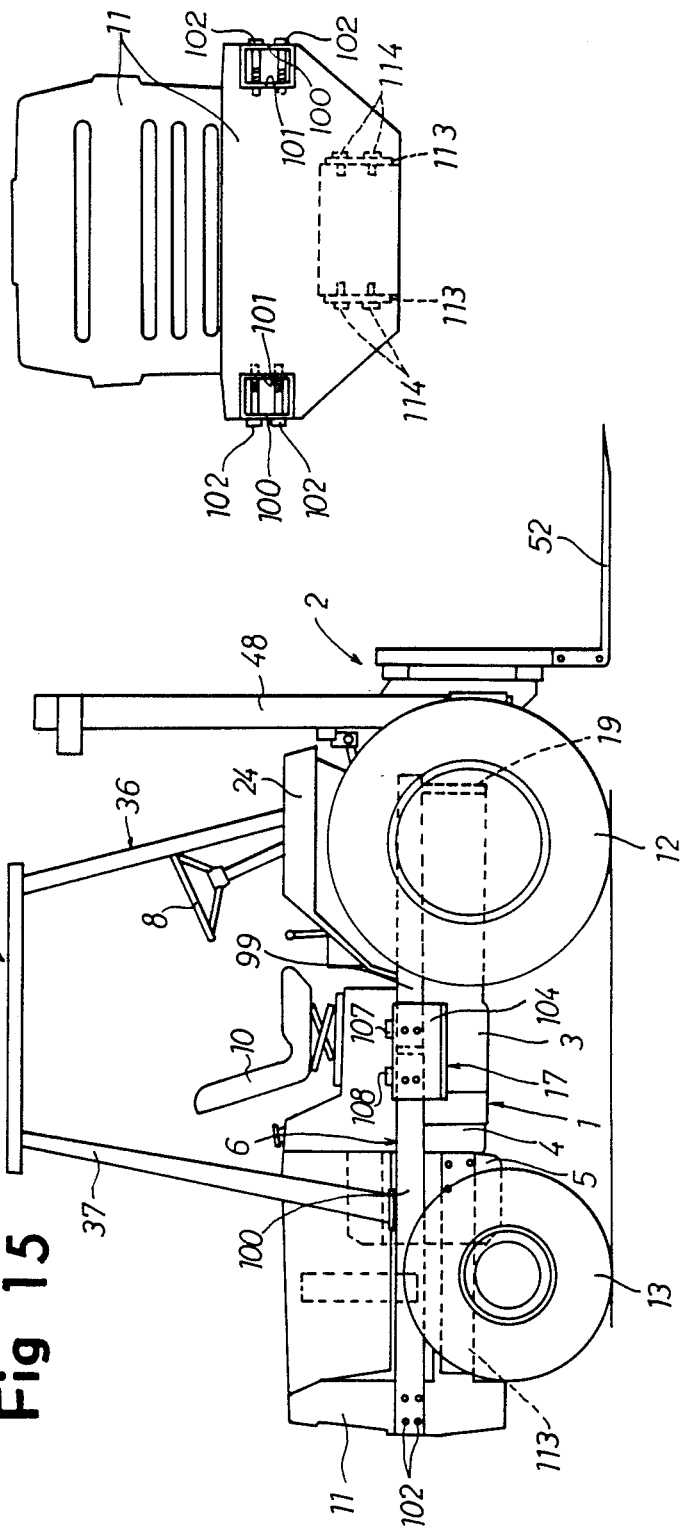
FIG. 15 is a side elevation showing a modified load handling vehicle in its entirety.
Figure 16:
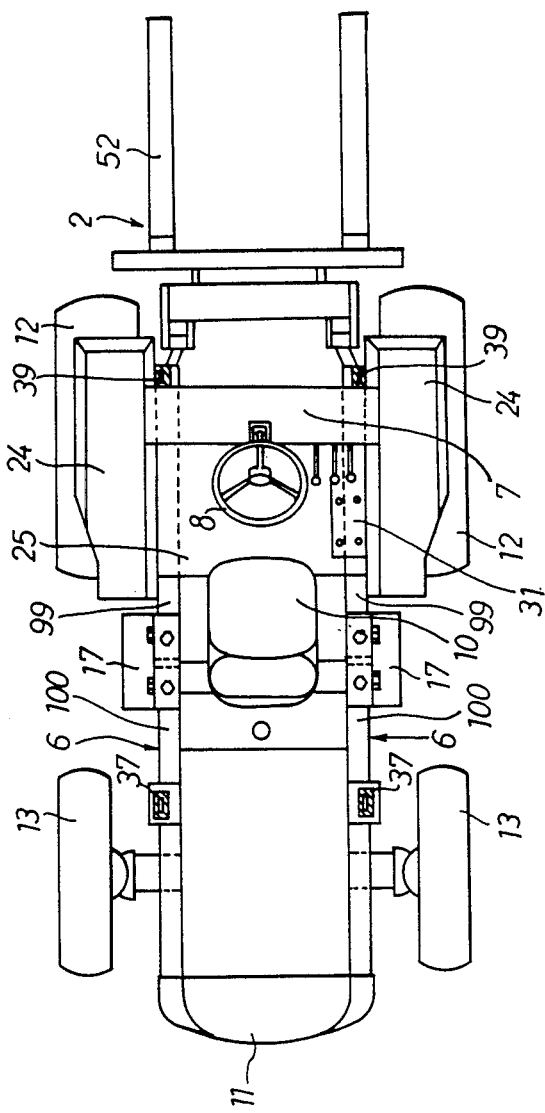
FIG. 16 is a plan view showing the vehicle in its entirety.

FIGS. 15 and 16 show opposite reinforcing frames 6 each of which is divided into front and rear segments 99 and 100 in the vicinity of a divided portion of the vehicle body 1. These segments are interconnected to assure facilitated inspection and maintenance.

Figure 18:
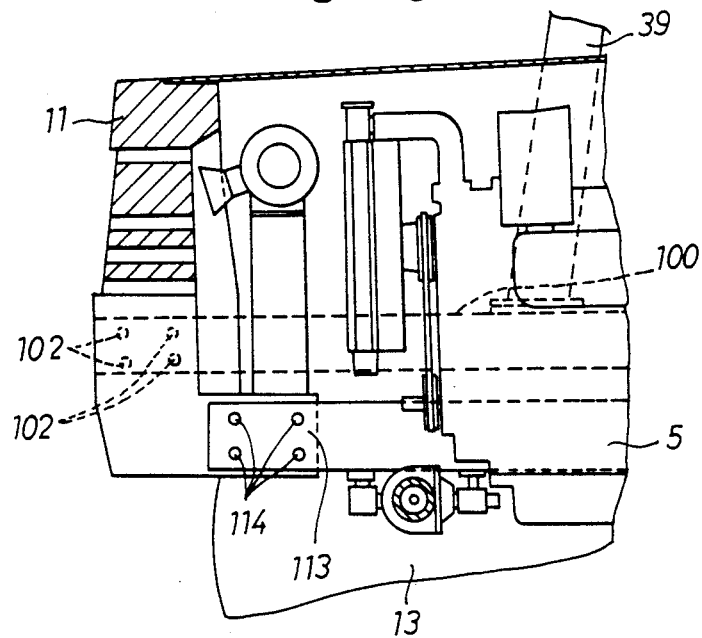
FIG. 18 is a side elevation in section showing the vehicle rear portion.

Stated more specifically, the reinforcing frame 6 is composed of a front frame segment 99 and a rear frame segment 100 which are fixed to the separable front and rear segments of the vehicle body 1, respectively, and are separably interconnected end-to-end by the step 17. The opposed front frame segments 99 are fixed to the transmission case 3 by the connecting plate 19 attached to the front ends of the segments 99. The opposed rear frame segments 100 are bolted to opposite sides of the engine 5 and also fastened at their rear ends to recessed portions 101 of the weight 11 by bolts 102 as seen in FIGS. 17 and 18. Rear axle frames 113 extending rearward from the engine 5 are secured to the lower portion of the weight 11.

With reference to FIGS. 19 and 20, the step 17 has an outwardly extending step plate 103, a side wall 104 extending upward from the inner end of the step plate 103, an upper wall 105 and a lower wall 106 which extend inward from the side wall 104, and a reinforcement 120 extending from the step plate 103 to the lower wall 106 on the bottom side thereof. The front and rear frame segments 99, 100 are opposed to each other end-to-end within the space defined by the upper wall 105, the side wall 104 and the lower wall 106 of the step 17 and are fastened to the step 17 by vertical bolts 107 and 108, respectively. Accordingly the frame segments 99 and 100 can be separated by removing the bolts 107, 108 and removing the step 17. The vehicle body 1 can then be disassembled easily. Collars 109 may be provided for inserting the bolts 107 and 108 therethrough as indicated in broken lines in FIG. 20.

Figure 21:
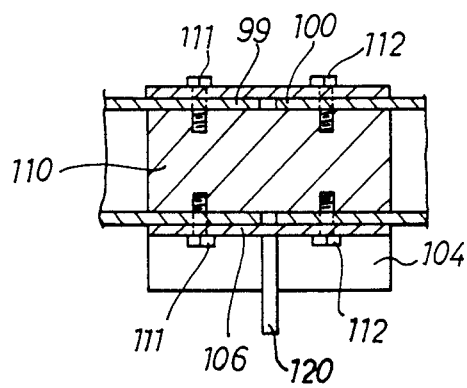
FIG. 21 is a side elevation in section showing a modification of the divided portion of the frame.
Figure 22:
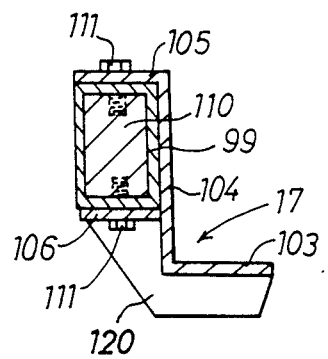
FIG. 22 is a cross sectional view of the modification.

Further as seen in FIGS. 21 and 22, a connecting member 110 may be inserted in the opposed ends of the front and rear frame segments 99 and 100 across the divided portion. In this case, the segments 99 and 100 are fastened to the connecting member 110 with bolts 111 and 112 from above and below.

Further aside from the connection by the step 17, the front and rear frame segments 99 and 100 may be connected together end-to-end using flanges and bolts for fastening.

The safety frame 14 may be of the two-post type having the pair of opposite front posts 36. Although the safety device 14 has been described as an example of protective device, the protective device can be an awning device, compartment or the like.

What is claimed is:

1. A load handling vehicle comprising:
    a vehicle body comprising a longitudinal series connection of a transmission case, a clutch housing and an engine frame;
    a pair of frames extending longitudinally on opposite sides of said vehicle body to reinforce said body;
    a pair of front wheel fenders covering a pair of front wheels and extending upward above a step plate on said body;
    a steering panel equipped with a steering wheel and other control means for operating a load handling device, and a front cover covering space under said steering panel, said panel and cover being provided between said pair of front fenders and being almost as wide as said body;
    a protective device covering an operator seat, said protective device including a pair of front posts connected, in front of said seat and at inner sides of said front wheel fenders, to said pair of frames;
    a load handling device secured to a front end of said body and in front of said panel;
    said front posts being positioned adjacent to said front cover;

said front posts comprising lower members standing on said frames and separate upper members; and said panel being clamped between said lower members and said upper members by bolts, passing through said panel and detachably connecting said lower members to said upper members.

2. A vehicle as noted in claim 1, wherein said lower members have tops and front sides, said tops being covered by said steering panel and said front sides being covered by said front cover.

3. A vehicle as noted in claim 1, wherein ends of said steering panel and of said front cover are respectively fixed on opposite sides to said pair of front wheel fenders.

4. A vehicle as noted in claim 1, wherein said steering panel and said front cover are formed integrally.

5. A vehicle as noted in claim 1, wherein said front posts are separable into said upper members and said lower members at an intermediate having approximately the same height as said front wheel fenders.

6. A load handling vehicle comprising:
a vehicle body comprising a longitudinal series connection of a transmission case, a clutch housing and an engine frame;
a pair of frames extending longitudinally on opposite sides of said vehicle body to reinforce said body;
a pair of front wheel fenders covering a pair of front wheels and extending upward above a step plate on said body;
a steering panel equipped with a steering wheel and other control means for operating a load handling device, and a front cover having two ends and covering space under said steering panel, said panel having two ends and said cover being provided between said pair of front fenders and being almost as wide as said body;
a protective device covering an operator seat, said protective device including a pair of front posts connected, in front of said seat and at inner sides of said front wheel fenders, to said pair of frames;
a load handling device secured to a front end of said body and in front of said panel;
said pair of front posts being positioned adjacent to said front cover and comprising lower post members standing on said frames and separate upper post members removably connected to said lower members;
a connecting bar being provided to connect the pair of said lower post members to establish reinforcement by being attached at upper ends of said lower post members and being fastened to the steering panel, the front cover, the steering wheel and a lever means for said load handling device;
said two ends of said steering panel being attached to said front wheel fenders provided at two sides of the vehicle body and also said two ends of said front cover being attached to the lower member standing at the two sides;
a value unit for operating the load handling device being located at a position at a front end of said step plate and slightly below said front cover, and coupling rods connecting said lever means and said valve unit being arranged vertically just behind said front cover; and said lower post members have tops and front sides, said tops being covered by said steering panel and said front sides being covered by said front cover.

7. A vehicle as noted in claim 6, wherein ends of said steering panel are fixed, on opposite sides of said body, to said front wheel fenders, and ends of said front cover are fixed on opposite sides of said body to said lower post members.

8. A vehicle as noted in claim 6, wherein said steering panel and said front cover are formed integrally.

9. A vehicle as noted in claim 6, wherein said front posts are separable into said upper members and said lower members at joints having about the same height as tops of the front wheel fenders and said steering panel, said front wheel fender and said lower members extend to approximately the same height.

10. A vehicle as noted in clam 6, wherein upper joint portions of said lower members and lower joint portions of said upper members are formed to be plates, and these two joint portions are fitted over one another and fastened removably by bolts.

11. A vehicle as noted in claim 6, wherein said front wheel fenders and said steering panel have the same height, and upper joint portions of said lower members are removably attached on upper surfaces of said front wheel fenders and said steering panel.

12. A vehicle as noted in claim 6, wherein a load handling lever, extending upward above said steering panel, is pivotably supported on said connecting bar which interconnects a pair of joint portions of said lower post members, and a coupling rod connects said load handling lever to a valve unit, positioned on said vehicle body, for operating said load handling device, said coupling rod being positioned adjacent a rear surface of said front cover.

13. A vehicle as noted in claim 6, wherein a lower end of said lower post member is secured at an outer side surface of said frame and said front wheel fender is attached to an outer side surface of said lower member.

14. A vehicle as noted in claim 6, wherein a panel bracket is fixed to a center portion of said connecting bar and projects rearwardly from said connecting bar, said panel bracket being secured by bolts to a connecting plate located at a lower end of a steering post for supporting a steering wheel and to said steering panel.

15. A vehicle as noted in claim 12, wherein a lever bracket is provided on an underside of said connecting bar adjacent one end of said bar,
a lower end of said load handling lever being pivoted on said lever bracket by a pin, and
a coupling rod being connected to said load handling lever at a point spaced rearwardly from said pin.

16. A vehicle as noted in claim 12, wherein said valve unit is located on a front side of a connecting plate interconnecting said pair of frames and under said front cover.

17. A vehicle as noted in claim 6, wherein said load handling device comprises a pair of opposed masts, a lift frame with up-down mobility along said masts and a fork mount movable transversely with respect to said lift frame and wherein a fork is mounted on said fork mount.

18. A vehicle as noted in claim 6, wherein said load handling device comprises a pair of opposed masts, a lift frame with up-down mobility along said masts and wherein a fork mount to mount a fork on said lift frame or a bucket mount to mount a bucket on said lift frame is selectively removably mountable.

19. A vehicle as noted in claim 6, wherein said vehicle body is arranged to be dividable longitudinally and said pair of frames are also arranged to be dividable longitudinally at a position adjacent to the division location of the body, and said body and said frames are connected transversely at positions adjacent to the respective divisions.

* * * * *